(12) United States Patent
Yamanaka et al.

(10) Patent No.: US 10,655,976 B2
(45) Date of Patent: May 19, 2020

(54) SYSTEM AND METHOD FOR MAKING REPLENISHMENT RECOMMENDATION

(71) Applicant: HONDA MOTOR CO., LTD., Minato-ku, Tokyo (JP)

(72) Inventors: Keizo Yamanaka, Wako (JP); Hiroyuki Tomosugi, Wako (JP); Yusuke Maino, Wako (JP); Takayuki Iimura, Wako (JP); Masahiro Yoshino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 48 days.

(21) Appl. No.: 16/111,968

(22) Filed: Aug. 24, 2018

(65) Prior Publication Data

US 2019/0072401 A1    Mar. 7, 2019

(30) Foreign Application Priority Data

Sep. 1, 2017 (JP) .................................. 2017-168916

(51) Int. Cl.
  *G01C 21/34* (2006.01)
  *G01C 21/36* (2006.01)
(52) U.S. Cl.
  CPC ....... *G01C 21/3469* (2013.01); *G01C 21/367* (2013.01); *G01C 21/3682* (2013.01); *G01C 21/3697* (2013.01)
(58) Field of Classification Search
  CPC .............. G01C 21/3469; G01C 21/367; G01C 21/3682; G01C 21/3697
  See application file for complete search history.

(56) References Cited

U.S. PATENT DOCUMENTS 5,568,390 A * 10/1996 Hirota ................ G01C 21/3469
                                                                    701/410
6,249,720 B1    6/2001 Kubota et al.
                                                            (Continued)

FOREIGN PATENT DOCUMENTS

| JP | H1137766 A | 2/1999 |
|---|---|---|
| JP | 2007255996 A | 10/2007 |
| JP | 2008174193 A | 7/2008 |

OTHER PUBLICATIONS

English translation of Notice of Reasons for Refusal for JP Application No. 2017-168916, dated May 28, 2019.
(Continued)

*Primary Examiner* — Alan D Hutchinson
*Assistant Examiner* — Andy Schneider
(74) *Attorney, Agent, or Firm* — Armstrong Teasdale LLP

(57) ABSTRACT

A replenishment recommendation system (1) is provided with a recommendation generation trigger point computation unit (32) configured to compute a recommendation generation trigger point given as a remaining amount of energy that triggers an energy replenishment recommendation to the driver to replenish energy based on past remaining amounts stored in a storage unit, and a recommendation generation unit (33) configured to display a replenishment recommendation indication on a display unit when a current energy remaining amount of the vehicle has become equal to or less than the recommendation generation trigger point. The storage unit stores, as the past remaining amount, a remaining amount of energy of the vehicle when a replenishment intent switch (38) is operated by a driver.

13 Claims, 5 Drawing Sheets

(56) References Cited

U.S. PATENT DOCUMENTS

| | | | | |
|---|---|---|---|---|
| 6,591,185 B1* | 7/2003 | Polidi | ............... | G01C 21/3469 180/69.4 |
| 9,103,687 B1* | 8/2015 | Loo | ................ | G01C 21/3469 |
| 9,954,967 B1* | 4/2018 | Gheorghe | ............... | H04L 67/28 |
| 2005/0075119 A1* | 4/2005 | Sheha | ................ | G01C 21/26 455/456.6 |
| 2007/0222573 A1* | 9/2007 | Navarro | ................ | E02F 9/226 340/457.4 |
| 2009/0157289 A1* | 6/2009 | Graessley | ................ | B60L 3/12 701/123 |
| 2010/0198508 A1* | 8/2010 | Tang | ................ | G01C 21/3469 701/414 |
| 2011/0246019 A1* | 10/2011 | Mineta | ............... | B60W 50/0097 701/31.4 |
| 2011/0301806 A1* | 12/2011 | Messier | ............ | G01C 21/3469 701/423 |
| 2012/0116670 A1* | 5/2012 | Rosekrans | ......... | G01C 21/3469 701/426 |
| 2012/0226435 A1* | 9/2012 | Yuasa | ................ | G01C 21/3453 701/123 |
| 2013/0073105 A1* | 3/2013 | Schmid | ................ | H02J 3/382 700/295 |
| 2015/0088409 A1* | 3/2015 | Thomas | ............. | G01C 21/3697 701/400 |
| 2015/0154638 A1* | 6/2015 | Burlingham | ....... | G06Q 30/0259 705/14.57 |
| 2015/0226566 A1* | 8/2015 | North | ................ | G01C 21/3469 701/428 |
| 2016/0091338 A1* | 3/2016 | Abuelsaad | ......... | G01C 21/3697 701/538 |
| 2017/0015318 A1* | 1/2017 | Scofield | ............... | G08G 1/0112 |
| 2017/0287237 A1* | 10/2017 | Koenig | ................ | G07C 5/008 |
| 2018/0299897 A1* | 10/2018 | Cashler | ............... | G05D 1/0217 |
| 2019/0178664 A1* | 6/2019 | Dudar | ............... | G01C 21/3469 |
| 2019/0204111 A1* | 7/2019 | Buttner | ............. | G01C 21/3679 |
| 2019/0234756 A1* | 8/2019 | Lin | .................... | G01C 21/3679 |
| 2019/0275902 A1* | 9/2019 | Katanoda | ................. | B60L 3/08 |

OTHER PUBLICATIONS

English translation of Written Argument for JP Application No. 2017-168916, dated Jun. 7, 2019.

English translation of Written Amendment for JP Application No. 2017-168916, dated Jun. 7, 2019.

English translation of Decision to Grant a Patent for JP Application No. 2017-168916, dated Jun. 25, 2019.

Notice of Reasons for Refusal for JP Application No. 2017-168916, dated May 28, 2019, 4 pages.

* cited by examiner

SYSTEM AND METHOD FOR MAKING REPLENISHMENT RECOMMENDATION

TECHNICAL FIELD

The present invention relates to a system and a method for making a recommendation to replenish energy to a vehicle at a timing that suits a preference of a vehicle driver.

BACKGROUND ART

It is known to provide a system for making a recommendation to refuel a vehicle according to the past refueling history of the vehicle driver. See JPH11-37766A, for instance. According to this known system, the remaining amounts of fuel at the time of the most recent five instances of refueling are stored, and the values of these remaining amounts are averaged. When the current fuel level falls below this averaged value, the system notifies the vehicle driver that the time has come for refueling by using synthesized speech. Because the timing of refueling is based on the past history of the vehicle driver, the preference of the vehicle driver is taken into account in determining the timing of issuing a recommendation.

However, because the timing is computed from the amounts of fuel remaining in the fuel tank when the refueling has actually taken place, and the timing of actual refueling is inevitably delayed from the time point of receiving the recommendation, the timing of recommendation tends to be progressively delayed over time. In other words, when the vehicle operator refuels the vehicle in response to a recommendation, owing to the inevitable delay in reaching the gas station, the remaining amount of fuel at the time of refueling is less than the remaining amount of fuel that triggered the recommendation. As this delay accumulates over time, the timing of refueling recommendation may be delayed eventually well beyond the liking of the vehicle driver. This problem is particularly acute when the vehicle is operated in an area where gas stations are not numerous.

SUMMARY OF THE INVENTION

In view of such a problem of the prior art, a primary object of the present invention is to provide a system and a method for making a replenishment recommendation to a vehicle driver which can make a replenishment recommendation at a timing that suits the preference of the vehicle operator without fail.

To achieve such an object, the present invention provides a replenishment recommendation system (1) for making a recommendation to a driver of a vehicle to replenish energy for the vehicle, comprising: a replenishment intent switch (38) configured to be operated by the driver to indicate an intent to replenish energy; a storage unit (31) configured to store a remaining amount of energy of the vehicle as a past remaining amount when a first condition is satisfied, the first condition being satisfied by an operation of the replenishment intent switch; a recommendation generation trigger point computation unit (32) configured to compute a recommendation generation trigger point given as a remaining amount of energy that triggers an energy replenishment recommendation to the driver to replenish energy based on the past remaining amounts stored in the storage unit; and a recommendation generation unit (33) provided with a display unit (14) and configured to display a replenishment recommendation indication (37) on the display unit when a current energy remaining amount of the vehicle has become equal to or less than the recommendation generation trigger point.

Because the past remaining amounts are stored based on the timing at which the vehicle driver has indicated an intent to replenish energy, the data stored in the storage unit faithfully reflects the preference of the vehicle driver. In particular, even when the actual replenishment of energy is delayed from the time point at which the recommendation is made owing to the absence of suitable energy replenishment stations in the vicinity of the vehicle, the system is able to maintain a proper timing for making a recommendation.

The system may further comprise a replenishment detection unit (41) configured to detect a replenishment of energy for the vehicle, and a selection unit (34) configured to cause the storage unit to store, as the past remaining amount, an energy remaining amount at a time point of displaying the replenishment recommendation indication on the display unit if a second condition is satisfied, the second condition being satisfied when the replenishment intent switch is not operated, and a distance traveled by the vehicle from the time point of displaying the energy replenishment recommendation indication to a time point of detecting the replenishment of energy is equal to or less than a prescribed distance determination value.

Owing to this arrangement, even when the vehicle operator fails to operate the replenishment intent switch, the storage unit is enabled to add new data which reflects the preference of the vehicle operator. If the time point of actual energy replenishment is delayed from the time point of displaying the replenishment recommendation indication as indicated by the distance traveled by the vehicle during this time period, no new data may be added to the storage unit depending on the circumstance as it is likely to be the case where the vehicle operator took a long time before fining the desired energy replenishment station.

Preferably, the selection unit is configured to cause the storage unit to store, as the past remaining amount, an energy remaining amount at a time point of initiation of energy replenishment, instead of at the time point of displaying a replenishment recommendation indication on the display unit, if a third condition is satisfied, the third condition being satisfied when the replenishment intent switch is not operated, the distance traveled by the vehicle from the time point of displaying the replenishment recommendation indication to the time point of detecting the replenishment of energy is greater than the prescribed distance determination value, and a difference between the recommendation generation trigger point and the energy remaining amount at the initiation of energy replenishment is smaller than a prescribed remaining amount difference determination value.

Even when the vehicle operator fails to operate the replenishment intent switch, and the time point of actual energy replenishment is delayed from the time point of displaying the replenishment recommendation indication as indicated by the distance traveled by the vehicle during this time period, if the difference between the recommendation generation trigger point and the energy remaining amount at the initiation of energy replenishment is smaller than a prescribed remaining amount difference determination value, the new data may be added to the storage unit as it does not cause any error in reflecting the driver's preference in the data stored in the storage unit.

According to a preferred embodiment of the present invention, the selection unit is configured to store no new data to the storage unit if a fourth condition is satisfied, the fourth condition being satisfied when the replenishment intent switch is not operated, the distance traveled by the vehicle from the time point of displaying the replenishment recommendation indication to the time point of detecting the replenishment of energy is greater than the prescribed distance determination value, and the difference between the recommendation generation trigger point and the energy remaining amount at the initiation of energy replenishment is equal to or greater than the prescribed remaining amount difference determination value.

When the fourth condition is satisfied, as it obviously is the case where the actual time point of energy replenishment is far removed from the preference of the vehicle operator, it is proper to store no new data to the storage unit.

Preferably, the replenishment intent switch is generated or enabled only when the replenishment recommendation indication is displayed on the display unit.

Thereby, an inadvertent operation of the replenishment intent switch can be avoided so that the accuracy of the system can be enhanced.

Preferably, the recommendation generation trigger point computation unit is configured to compute the recommendation generation trigger point by averaging a plurality of the past remaining amounts.

Thereby, the recommendation generation trigger point can be computed from the past history with a highly simple computation process.

The system may further comprise an energy remaining amount sensor (3) for detecting the current energy remaining amount, the replenishment detection unit being configured to detect an initiation of replenishment when the current energy remaining amount has increased by more than a prescribed amount during a prescribed time period.

Thereby, an energy replenishment can be detected in a highly simple manner.

Preferably, the system further comprises a warning light (8) that lights up when the current energy remaining amount is equal to or less than a prescribed warning remaining amount, wherein the recommendation generation unit is configured not to display the replenishment recommendation indication on the display unit if the warning light has lighted up even when the current energy remaining amount is equal to or less than the recommendation generation trigger point.

Thereby, the warning light and the replenishment recommendation indication are prevented from being activated at the same time so that the vehicle operator is prevented from being annoyed or confused by such a simultaneous indication.

The display unit may be formed as a touch panel display unit (18), and the replenishment intent switch may be selectively generated on the touch panel display.

Thereby, the replenishment intent switch can be generated only when required without complicating the system.

The replenishment intent switch may be generated in a superimposed relationship to the replenishment recommendation indication displayed on the touch panel display.

Thereby, the vehicle operator is enabled to operate the replenishment intent switch in an intuitive manner.

The system may further comprise a replenishment station recommendation unit (34) configured to display information on at least one recommended energy replenishment station on the display unit when the driver's intent to replenish energy is entered from the replenishment intent switch.

Thereby, the vehicle operator can obtain the information on the available energy replenishment stations when such information is highly desired.

Preferably, the replenishment station recommendation unit is configured to assign priority levels to a plurality of recommended energy replenishment stations according to pricing and/or the driver's selection history, and to display information on at least some of the recommended energy replenishment stations according to the priority levels.

Thereby, the driver's preference is conveniently taken into account in the display so that the comfort of the vehicle operator can be maximized.

The present invention further provides a replenishment recommendation method for making a recommendation to a driver of a vehicle to replenish energy for the vehicle by using the system as defined above, comprising: storing a remaining amount of energy of the vehicle in the storage unit as a past remaining amount when a first condition is satisfied, the first condition being satisfied by a detection of an operation of the replenishment intent switch; computing a recommendation generation trigger point given as a remaining amount of energy that triggers an energy replenishment recommendation to the driver to replenish energy based on the energy remaining amounts stored in the storage unit; and displaying a replenishment recommendation indication on the display unit when a current energy remaining amount of the vehicle has become equal to or less than the recommendation generation trigger point.

BRIEF DESCRIPTION OF THE DRAWING(S)

DESCRIPTION OF THE PREFERRED EMBODIMENT(S)

A preferred embodiment of the present invention is described in the following with reference to the appended drawings. A replenishment recommendation system according to the present invention is installed in a vehicle which may be powered by an internal combustion engine or a vehicle powered by an electric motor. When the vehicle consists of an internal combustion engine powered vehicle, a liquid fuel such as gasoline and diesel oil, or a gaseous fuel such as natural gas, propane gas and hydrogen gas will be replenished as a source of energy. Also, when the vehicle consists of an electric motor powered vehicle, electric power will be replenished as a source of energy. In the following embodiment, the replenishment recommendation system of the present invention is applied to an internal combustion engine powered vehicle using liquid fuel such as gasoline and diesel oil as a power source.

Figure 1:
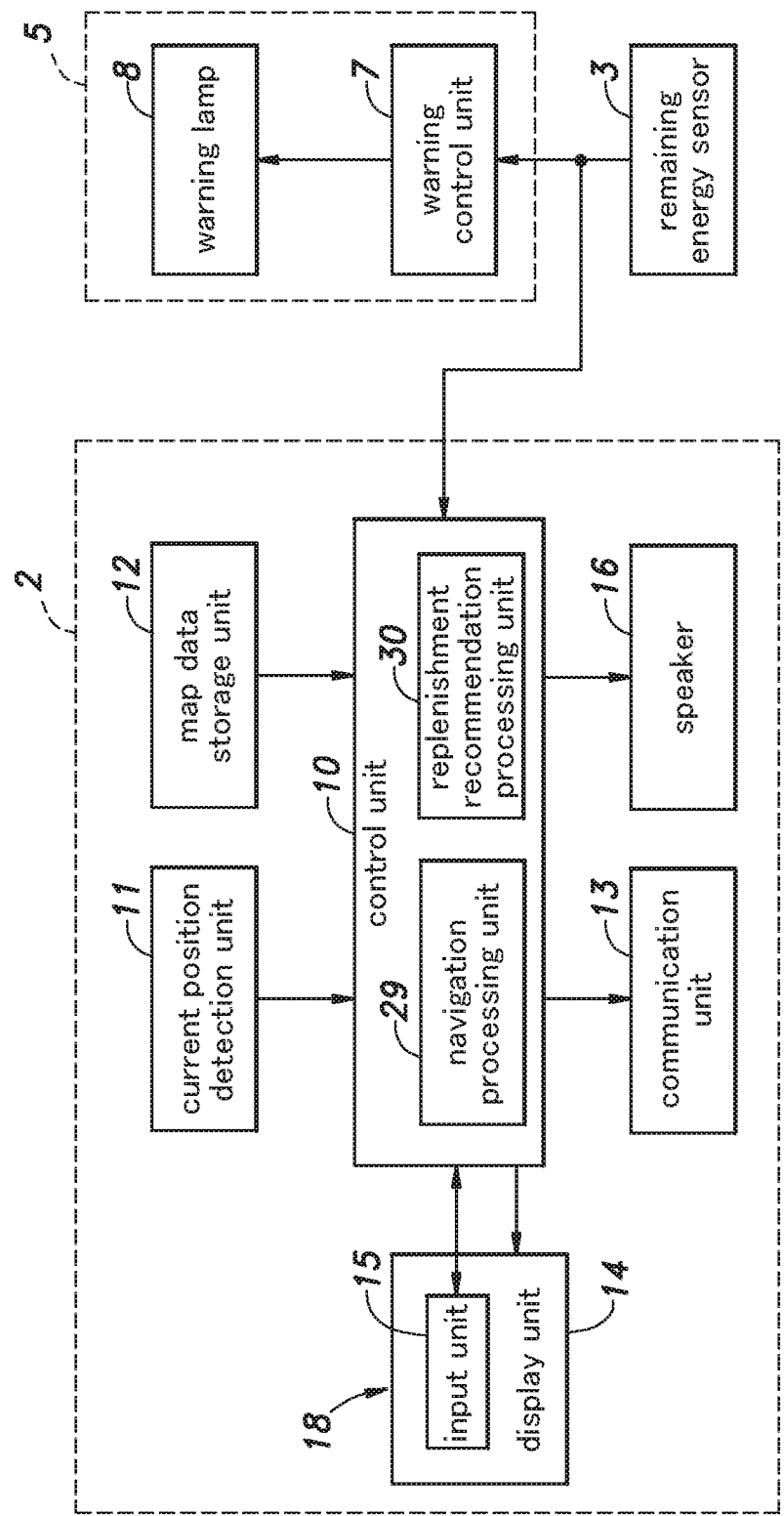
FIG. 1 is a block diagram of a vehicle equipped with a replenishment recommendation system according to an embodiment of the present invention.

As shown in FIG. 1, the replenishment recommendation system 1 of the illustrated embodiment is provided with a navigation device 2 for globally positioning the vehicle, a remaining energy sensor 3 configured to detect the remaining amount of fuel, and connected to the navigation device 2, and an alarm device 5 consisting of an audible and/or optical alarm device. The remaining energy sensor 3 and the alarm device 5 are connected to each other.

The remaining energy sensor 3 may consist of a fuel level sensor for detecting the fuel level of the fuel stored in the fuel tank in a per se known matter. The remaining energy sensor 3 produces a signal indicating the remaining amount of fuel in the fuel tank, and forwards the corresponding signal to the navigation device 2 and the alarm device 5.

The alarm device 5 includes an alarm control unit 7 connected to the remaining energy sensor 3, and a warning lamp 8 connected to the alarm control unit 7. The warning lamp 8 may consist of a fuel level warning lamp for indicating a decrease in the fuel level beyond a prescribed threshold valve, and is placed in the instrument panel of the vehicle.

The alarm control unit 7 acquires an energy remaining amount (%) based on the signal from the remaining energy sensor 3. The energy remaining amount is acquired as a ratio (%) of the remaining amount of energy to the full capacity of energy. The alarm control unit 7 compares the current energy remaining amount An with a previously stored warning remaining amount As, and turns on the warning lamp 8 when the current energy remaining amount An is equal to or less than the warning remaining amount As.

The navigation device 2 includes a control unit 10, a current position detection unit 11, a map data storage unit 12, a communication unit 13, a display unit 14, an input unit 15, and a speaker 16. The current position detection unit 11, the map data storage unit 12, the communication unit 13, the display unit 14, the input unit 15, and the speaker 16 are connected to the control unit 10.

The input unit 15 is incorporated in the display unit 14 so that the input unit 15 and the display unit 14 are formed by a touch panel display 18 of the navigation device 2. The display unit 14 may consist of an LCD panel or an organic EL display. The input unit 15 may consist of a capacitive touch panel integrally formed on the surface of the display unit 14. The touch panel display 18 including the display unit 14 and the input unit 15 is placed in the dashboard of the vehicle. The input unit 15 includes switches formed on the display unit 14 in association with graphics and texts displayed on the display unit 14.

Figure 3A:
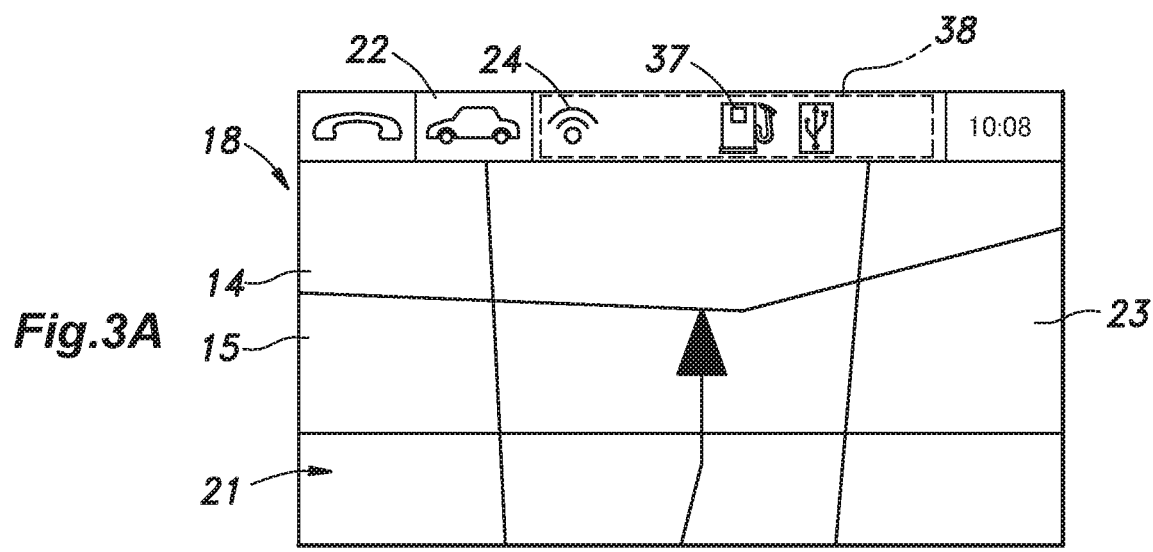
FIG. 3A is a main display view of a display unit.

A main screen 21 as shown in FIG. 3A is shown on the display unit 14 when the normal navigation is being executed. The main screen 21 includes a header 22 consisting of a strip extending laterally on the upper edge of the screen, and a guidance section 23 showing a map in the remaining part of the screen. The header 22 includes several icons 24.

When the main screen 21 is being displayed on the display unit 14, the input unit 15 generates switches in different areas of the header 22. A certain area surrounded by the dotted line in FIG. 3A corresponds to a switch which commands the control unit 10 to display a header item screen 26 shown in FIG. 3B. The header item screen 26 lists a plurality of items corresponding to the various icons displayed in the header 22 of the main screen 21, and is displayed in the area where the map has previously been shown.

The speaker 16 shown in FIG. 1 outputs voice guidance and sound effect according to various commands from the control unit 10.

The current position detection unit 11 includes a GPS receiver and various sensors such as a gyro sensor, a vehicle speed sensor, a steering sensor, a geomagnetic sensor and a yaw rate sensor, and detects the travel data of the vehicle such as the current position and traveling direction of the vehicle, and the travel distance.

The map data storage unit 12 consists of a storage medium such as a hard disk drive, a solid state drive, a DVD or the like. The map data storage unit 12 stores data necessary for map display and route guidance such as main map data, intersection data, road data, facility data, route search data, and destination search data. The facility data includes replenishment stations data regarding position and attributes (such as ownership and fuel brands) of gas stations.

The communication unit 13 is provided with network features enabling communication via various communication links such as a mobile phone communication link and a wireless LAN. Further, the communication unit 13 may include an FM receiver and a beacon receiver for receiving traffic information such as congestion information, regulation information and weather information.

The control unit 10 is formed by a CPU and memory, and performs the functions of a navigation processing unit 29 and a replenishment recommendation processing unit 30. The navigation processing unit 29 performs map matching based on the map data acquired from the map data storage unit 12 and the current position output from the current position detection unit 11. Further, the navigation processing unit 29 executes a route search processing and a route guidance processing based on the destination set by the input operation of the operator (driver) on the input unit 15, and outputs suitable commands to the display unit 14, the input unit 15 and the speaker 16.

Figure 2:
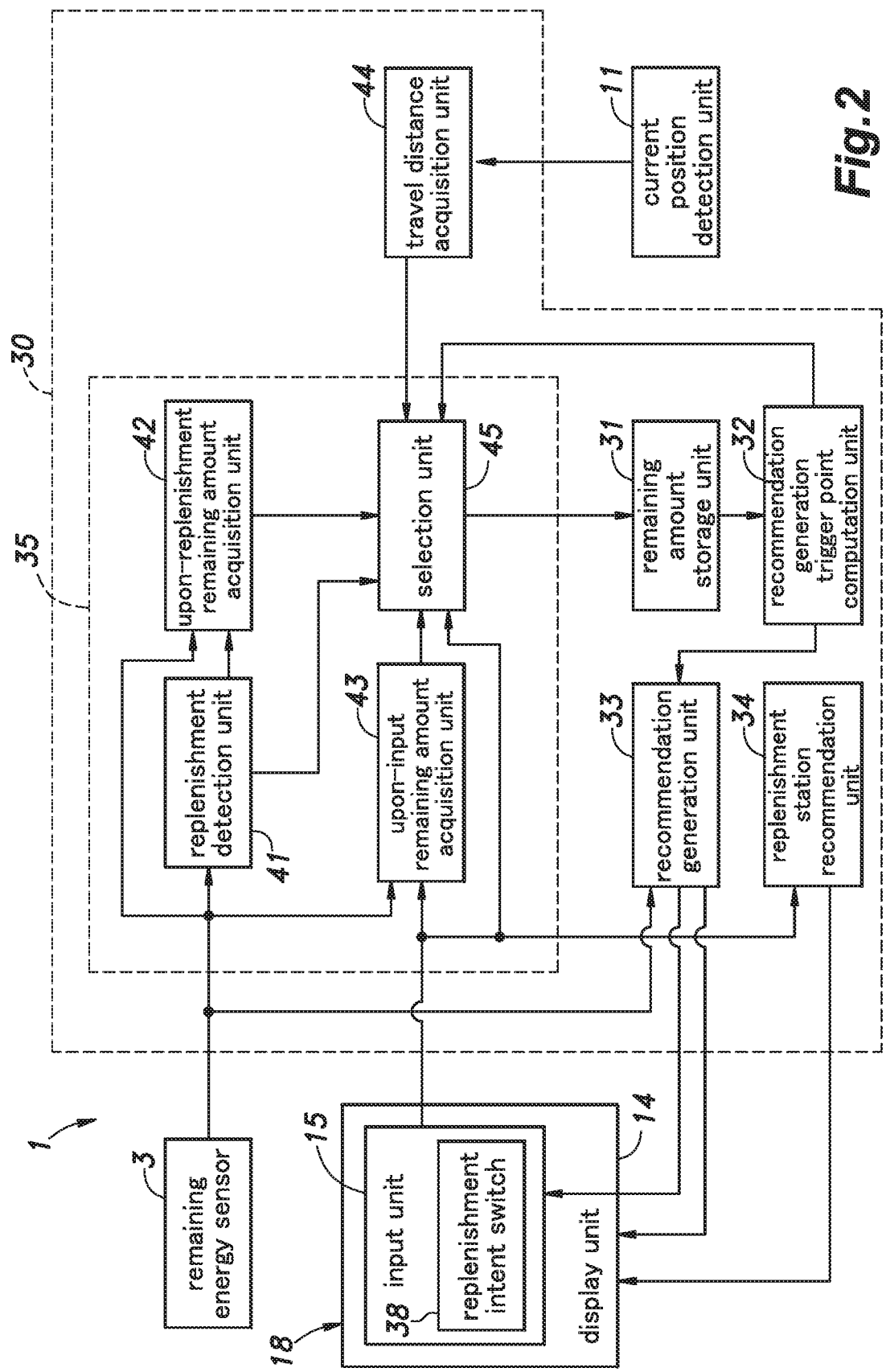
FIG. 2 is a block diagram of a replenishment recommendation processing unit of the replenishment recommendation system.

As shown in FIG. 2, the replenishment recommendation processing unit 30 includes a past remaining amount storage unit 31, a recommendation generation trigger point computation unit 32, a recommendation generation unit 33, a replenishment station recommendation unit 34, and a data selection unit 35.

The past remaining amount storage unit 31 stores the energy remaining amount An as a past remaining amount Ap when replenishment is initiated, when the driver's intent to replenish is inputted, or when a replenishment recommendation (which will be described hereinafter) is executed. The value stored as the past remaining amount Ap may be the absolute value of the amount of the replenished fuel (in liters, for example) or the ratio (%) of the amount of the replenished energy to the full capacity of energy. In the present embodiment, the value stored as the past remaining amount Ap is a ratio (%) of the amount of the replenished fuel to the full fuel capacity. The past remaining amount storage unit 31 stores a plurality of past remaining amounts Ap. The number of values of the past remaining amount Ap stored in the past remaining amount storage unit 31 may be a relatively small fixed number such as 10 and 50, but may also be a relatively large fixed number such as 10,000. The past remaining amount storage unit 31 stores the values of a predetermined number of past remaining amounts Ap as the initial value. The past remaining amount storage unit 31 may store five values each consisting of 15%, for example, as initial values.

Based on the past remaining amounts Ap stored in the past remaining amount storage unit 31, the recommendation generation trigger point computation unit 32 computes an recommendation generation trigger point Ar, which is the remaining amount of energy that triggers an energy replenishment recommendation. More specifically, the recommendation generation trigger point computation unit 32 computes the recommendation generation trigger point Ar by averaging a plurality of past remaining amounts Ap. For example, the recommendation generation trigger point computation unit 32 may set the average value of the last five past remaining amounts Ap as the recommendation generation trigger point Ar. In an alternate embodiment, the recommendation generation trigger point computation unit 32 sets the average value of all the past remaining amounts Ap stored in the past remaining amount storage unit 31 as the recommendation generation trigger point Ar.

The recommendation generation unit 33 obtains the current energy remaining amount An based on the signal from the remaining energy sensor 3. In the present embodiment, the recommendation generation unit 33 acquires the current energy remaining amount An as a ratio (%) of the remaining amount of energy to the full capacity of energy. The recommendation generation unit 33 compares the current energy remaining amount An with the recommendation generation trigger point Ar computed by the recommendation generation trigger point computation unit 32, and generates a recommendation generation command for a predetermined period of time after the current energy remaining amount An has become equal to or smaller than the recommendation generation trigger point Ar. The recommendation generation command is canceled after the predetermined period has elapsed.

In addition, the recommendation generation unit 33 may generate a recommendation generation command for a predetermined period of time from the time when the current energy remaining amount An is equal to or less than the recommendation generation trigger point Ar, and is greater than the warning remaining amount As. When the current energy remaining amount An is equal to or less than the warning remaining amount As, the recommendation generation unit 33 may prohibit the generation of the recommendation generation command regardless of the current energy remaining amount An.

The recommendation generation unit 33 displays a replenishment recommendation indication 37 on the display unit 14 based on the issuance of a recommendation generation command. The replenishment recommendation indication 37 may be an indication consisting of an icon representing a fueling pump, a text message, or the like. In the present embodiment, the replenishment recommendation indication 37 is displayed in the header 22 of the main screen 21 as shown in FIG. 3A. In an alternate embodiment, the replenishment recommendation indication 37 is displayed in the center of the guidance section 23 of the main screen 21.

In addition, the recommendation generation unit 33 causes the input unit 15 to generate a replenishment intent switch 38 for accepting the driver's intent to replenish energy in response to the recommendation generation command. The input unit 15 may generate the replenishment intent switch 38 at a position overlapping with the replenishment recommendation indication 37. For example, when the main screen 21 is displayed on the display unit 14, the input unit 15 may generate the replenishment intent switch 38 at a position overlapping with the replenishment recommendation indication 37 displayed in the header 22. When the header item screen 26 is being displayed on the display unit 14, the input unit 15 may generate the replenishment intent switch 38 at a position overlapping with a tab of "gas stations" on which the replenishment recommendation indication 37 is displayed. The input unit 15 outputs a replenishment intent signal to the replenishment recommendation processing unit 30 when the replenishment intent switch 38 is touched.

Figure 3B:
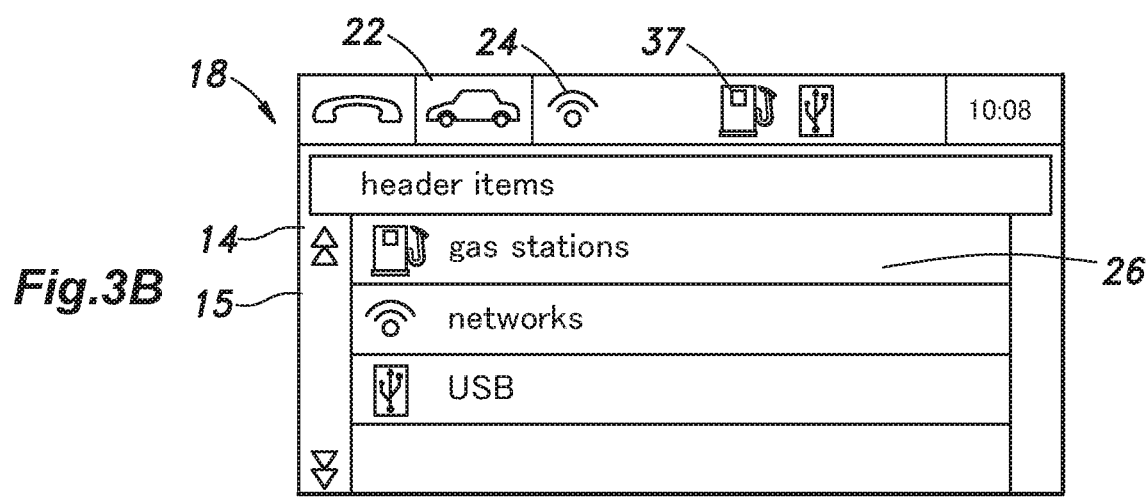
FIG. 3B is a header display view showing selections of header items.
Figure 3C:
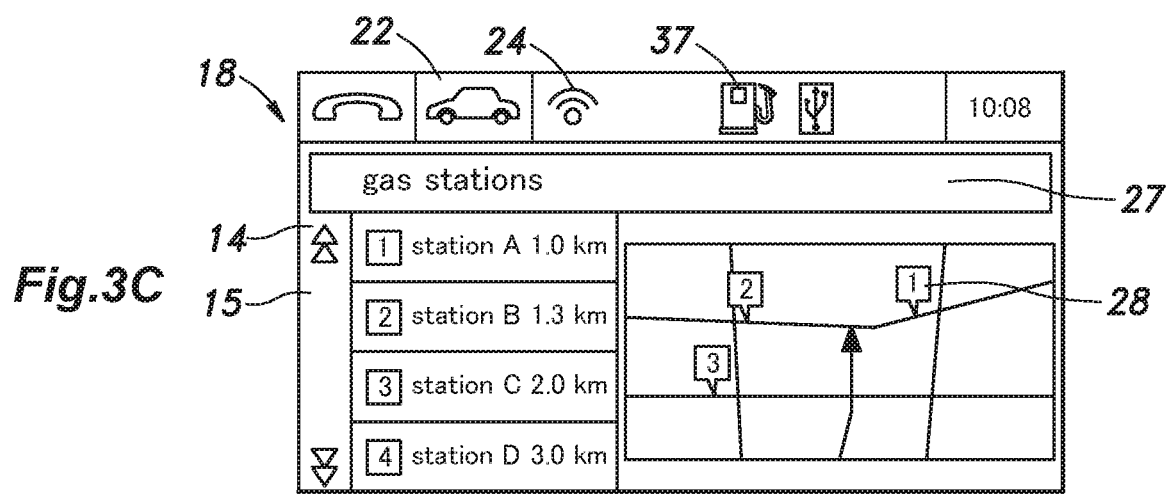
FIG. 3C is a replenishment station view showing selections of energy replenishment stations.

The replenishment station recommendation unit 34 determines at least one replenishment station to be recommended when the driver has inputted an intent to replenish to the input unit 15 or when a replenishment intent signal is received. Based on the current position of the vehicle, the replenishment station recommendation unit 34 searches information on replenishment stations stored in the map data storage unit 12, and collects information on replenishment stations close to the current position of the vehicle. Then, priorities are assigned to the replenishment stations included in the collected information. The replenishment station recommendation unit 34 sets a priority order to the replenishment stations to be recommended based on at least one of the energy price and the past selection frequency by the driver. When the item "gas stations" on the header item screen 26 shown in FIG. 3B is selected, the replenishment station recommendation unit 34 displays the replenishment station display screen 27 shown in FIG. 3C on the display unit 14. In the replenishment station display screen 27, information such as the positions of a plurality of recommended replenishment stations 28, dealer names, prices, priority levels of recommendation, and the like may be displayed.

As shown in FIG. 2, the data selection unit 35 includes a replenishment detection unit 41, an upon-replenishment remaining amount acquisition unit 42, an upon-input remaining amount acquisition unit 43, a travel distance acquisition unit 44, and a selection unit 45.

The replenishment detection unit 41 detects an energy replenishment (refueling) event based on a signal from the remaining energy sensor 3. The replenishment detection unit 41 monitors the current energy remaining amount An at a predetermined regular interval, and determines that energy replenishment has taken place when an increase in the energy remaining amount An exceeding a predetermined value in a predetermined time period is detected. Upon detecting an energy replenishment, the replenishment detection unit 41 generates a replenishment detection signal.

Based on the signal from the remaining energy sensor 3 and the replenishment detection signal from the replenishment detection unit 41, the upon-replenishment remaining amount acquisition unit 42 acquires the energy remaining amount at the start of the energy replenishment as the upon-replenishment remaining amount Af. Alternatively, upon receiving the replenishment detection signal, the upon-replenishment remaining amount acquisition unit 42 acquires the current energy remaining amount An, and subtracts a predetermined value from the current energy remaining amount An as an upon-replenishment remaining amount Af.

Based on the signal from the remaining energy sensor 3 and the replenishment intent signal from the input unit 15, the upon-input remaining amount acquisition unit 43 acquires the energy remaining amount at the time when the replenishment intent switch 38 of the input unit 15 is operated by the driver as an upon-input remaining amount Aw. Once the replenishment intent switch 38 is operated, and the resulting replenishment intent signal output by the input unit 15 is received, the upon-input remaining amount acquisition unit 43 acquires the energy remaining amount An, and stores the acquired energy remaining amount as the upon-input remaining amount Aw.

The travel distance acquisition unit 44 acquires the travel distance D of the vehicle based on the signal from the vehicle speed sensor included in the current position detection unit 11.

The selection unit 45 selects the value to be stored as the past remaining amount Ap in the past remaining amount storage unit 31 from either the upon-replenishment remaining amount Af obtained at the time of replenishment, the upon-input remaining amount Aw obtained at the time of input operation, or the recommendation generation trigger point Ar obtained at the time of making a replenishment recommendation. The recommendation generation trigger point Ar is the remaining amount of energy at the time when a replenishment recommendation is displayed on the display unit 14. The selection unit 45 receives a replenishment detection signal from the replenishment detection unit 41, the upon-replenishment remaining amount Af from the upon-replenishment remaining amount acquisition unit 42, the replenishment intent signal from the input unit 15, the upon-input remaining amount Aw from the upon-input remaining amount acquisition unit 43, the recommendation generation trigger point Ar from the recommendation generation trigger point computation unit 32, the recommendation command from the recommendation generation unit 33, and the travel distance D from the travel distance acquisition unit 44.

The selection unit 45 stores the upon-input remaining amount Aw in the past remaining amount storage unit 31 as the past remaining amount Ap when a first condition is satisfied, or when the replenishment intent input is received. Further, when a second conditions is satisfied, or when the input of intent to replenish is not received, and the travel distance D from the display of the replenishment recommendation indication 37 to the detection of replenishment is equal to or less than a distance determination value Ds, the selection unit 45 stores the recommendation generation trigger point Ar in the past remaining amount storage unit 31 as the past remaining amount Ap. Further, when a third condition is satisfied, or when no input of intent to replenish is received, and an energy replenishment is detected, the data selection unit 35 stores the upon-replenishment remaining amount Af in the past remaining amount storage unit 31 as the past remaining amount Ap. In addition, even when the third condition is satisfied, if a fourth condition is satisfied or if a remaining amount difference ΔA given as a difference between the upon-replenishment remaining amount Af and the recommendation generation trigger point Ar is equal to or less than a predetermined remaining amount difference determination value Ad, the selection unit 45 does not store the upon-replenishment remaining amount Af as the past remaining amount Ap.

Figure 4:
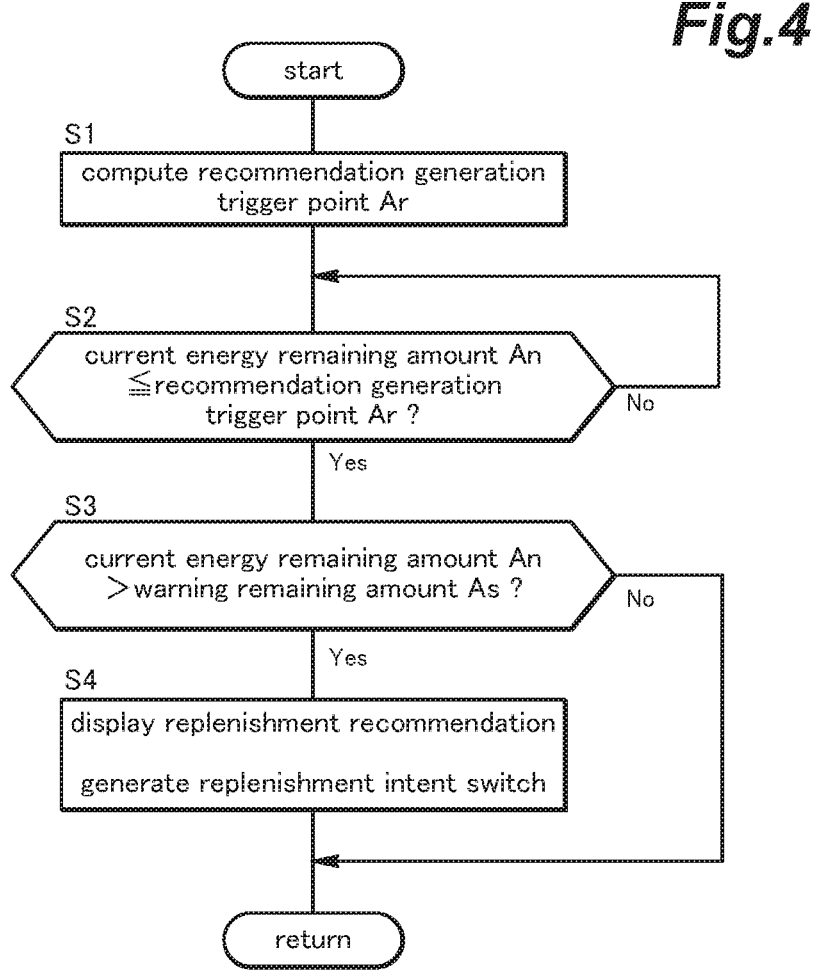
FIG. 4 is a flowchart showing a control process of a replenishment recommendation display process.

A control flow of the process executed by the replenishment recommendation processing unit 30 discussed above is described in the following with reference to FIGS. 4 and 5. In this process, the replenishment recommendation processing unit 30 first acquires the plurality of past remaining amounts Ap stored in the past remaining amount storage unit 31, and averages the acquired values of the past remaining amounts Ap to compute the recommendation generation trigger point Ar (step S1).

The replenishment recommendation processing unit 30 then determines if the current energy remaining amount An is equal to or less than the recommendation generation trigger point Ar (step S2). When the current energy remaining amount An is equal to or less than the recommendation generation trigger point Ar (the determination result in step S2 is YES), the replenishment recommendation processing unit 30 determines if the current energy remaining amount An is greater than the warning remaining amount As (step S3).

When the current energy remaining amount An is greater than the recommendation generation trigger point Ar (the determination result of step S3 is Yes), the replenishment recommendation processing unit 30 causes the display unit 14 to display the replenishment recommendation indication 37, and the replenishment intent switch 38 to be generated in the input unit 15 (step S4). The replenishment recommendation indication 37 and the replenishment intent switch 38 disappear after a predetermined period has elapsed. After executing the process of step S4, the program flow advances to the return, and repeats the replenishment recommendation display process. When the determination result in step S2 is No, the program flow repeats step S2 at a prescribed interval until the determination result of step S2 becomes Yes. When the determination result of step S3 is No, the replenishment recommendation processing unit 30 advances to the return, and repeats the replenishment recommendation display processing.

Figure 5:
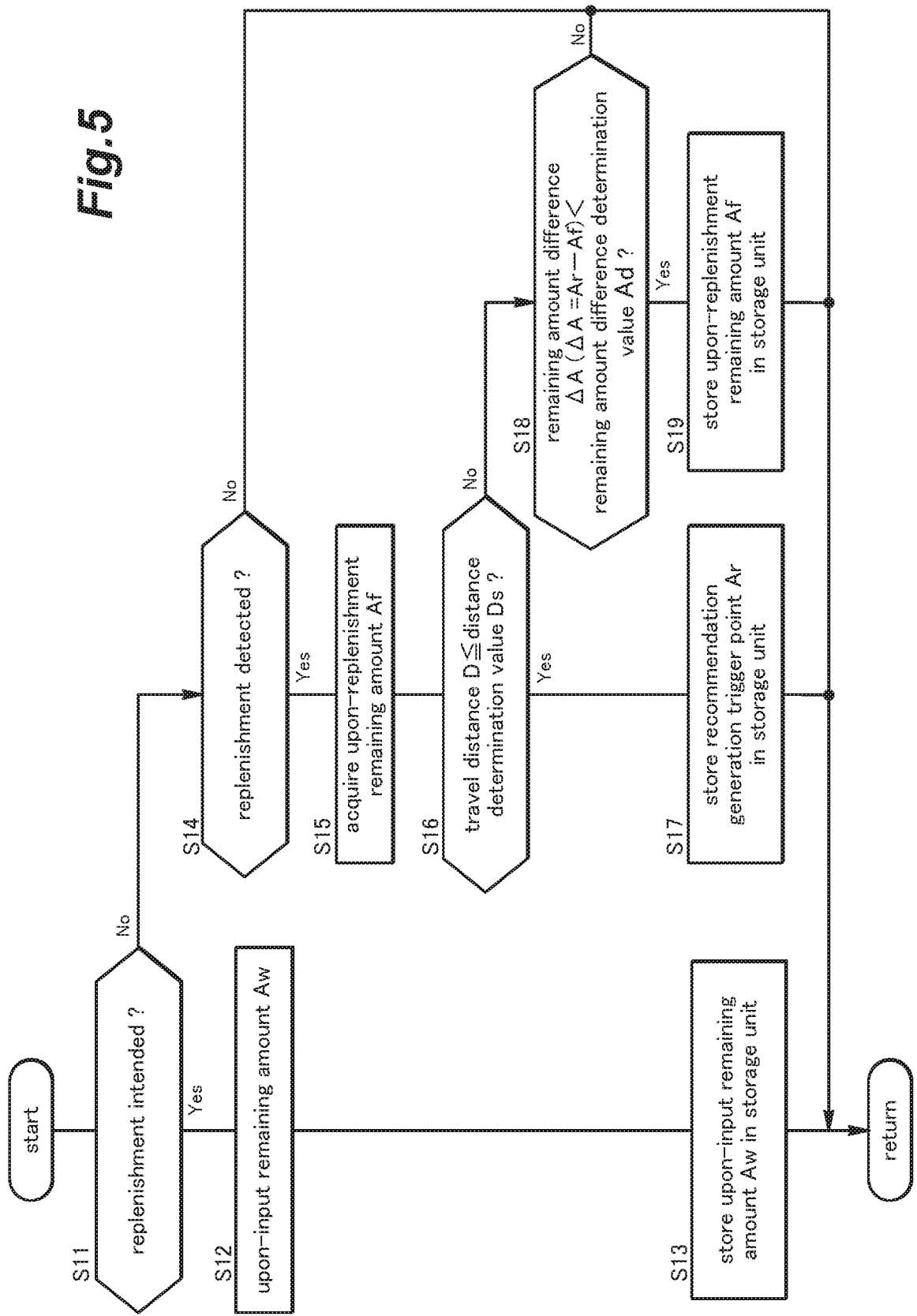
FIG. 5 is a flowchart showing a control process of an energy remaining amount storing process.

FIG. 5 shows a control flow of the process of storing past remaining amounts executed by the replenishment recommendation processing unit 30. In this control process, the replenishment recommendation processing unit 30 first determines the presence or absence of the intent to replenish (step S11). This determination process is based on the detection of the replenishment intent signal generated by the operation of the replenishment intent switch 38 by the driver. The replenishment intent switch 38 is selectively generated in the input unit 15 for the driver to operate. When the replenishment intent signal is detected (Yes in step S11), the replenishment recommendation processing unit 30 acquires the upon-input remaining amount Aw which is given by the energy remaining amount An when the replenishment intent signal is inputted (step S12). The acquired upon-input remaining amount Aw is stored in the past remaining amount storage unit 31 as the past remaining amount Ap (step S13).

When the determination result in step S11 is No, the replenishment recommendation processing unit 30 determines if an energy replenishment is detected (step S14). The replenishment recommendation processing unit 30 detects an energy replenishment when the energy remaining amount An increases by a predetermined value or more in a predetermined period. When a replenishment is detected (Yes in step S14), the replenishment recommendation processing unit 30 acquires the upon-replenishment remaining amount Af (step S15). If no energy replenishment is detected (No in step S14), the program flow advances to the return. In step S15, the replenishment recommendation processing unit 30 obtains the upon-replenishment remaining amount Af by acquiring the energy remaining amount An at the time when a replenishment is detected, and subtracting a predetermined value from the acquired energy remaining amount An.

Upon completion of the processing of step S15, the replenishment recommendation processing unit 30 determines if the travel distance D of the vehicle from the time when the recommendation command is generated to the time when an energy replenishment is detected is equal to or less than a distance determination value Ds (step S16). When the travel distance D is equal to or less than the distance determination value Ds (Yes in step S16), the replenishment recommendation processing unit 30 stores the recommendation generation trigger point Ar in the past remaining amount storage unit 31 as the past remaining amount Ap (step S17). Upon completion of the process of step S17, the replenishment recommendation processing unit 30 proceeds to the return, and repeats the past remaining amount storing process.

When the determination result in step S16 is No, the replenishment recommendation processing unit 30 determines if the remaining amount difference ΔA obtained by subtracting the upon-replenishment remaining amount Af from the recommendation generation trigger point Ar is smaller than the remaining amount difference determination value Ad (step S18). If the remaining amount difference ΔA is smaller than the remaining amount difference determination value Ad (Yes in step S18), the replenishment recommendation processing unit 30 stores the upon-replenishment remaining amount Af in the past remaining amount storage unit 31 as the past remaining amount Ap (step S19). Upon completion of the process of step S19, the replenishment recommendation processing unit 30 proceeds to the return, and repeats the past remaining amount storage process.

If the remaining amount difference ΔA is greater than or equal to the remaining amount difference determination value Ad (No in step S18), the program flow advances to the return, and repeats the past remaining amount storing process without the replenishment recommendation processing unit 30 storing either of the upon-replenishment remaining amount Af or the upon-input remaining amount Aw in the past remaining amount storage unit 31 (or no new data is added to the storage unit 31).

The advantages of the replenishment recommendation system 1 configured as described above are discussed in the following. When an intent to replenish is entered, or when the first condition is satisfied, the replenishment recommendation processing unit 30 stores the upon-input remaining amount Aw in the past remaining amount storage unit 31. As a result, a progressive reduction of the past remaining amount Ap stored in the amount storage unit 31 can be avoided. In other words, in spite of an avoidable significant decrease in the energy remaining amount from the time point of a replenishment recommendation to the time point of an actual energy replenishment, the corresponding decrease in the level of the subsequent recommendation generation trigger point Ar can be avoided, and the timing of displaying the subsequent replenishment recommendation indication 37 is prevented from being delayed. Therefore, the replenishment recommendation system 1 is enabled to make a replenishment recommendation at a timing that suits the driver's preference.

When no entry of an intent to replenish is detected, and the travel distance D from the time point of showing the replenishment recommendation indication 37 to the time point of an actual energy replenishment is equal to or less than the distance determination value Ds, or when the second condition is satisfied, the replenishment recommendation processing unit 30 stores the recommendation generation trigger point Ar in the past remaining amount storage unit 31 as the past remaining amount Ap.

When no entry of an intent to replenish is detected, and the travel distance D from the time point of showing the replenishment recommendation indication 37 to the time point of an actual energy replenishment is greater than the distance determination value Ds, or when the third condition is satisfied, the replenishment recommendation processing unit 30 stores the upon-replenishment remaining amount Af in the past remaining amount storage unit 31 as the past remaining amount Ap.

Even when the third condition is satisfied, if the remaining amount difference ΔA is equal to or greater than the remaining amount difference determination value Ad, or when the fourth condition is satisfied, the replenishment recommendation processing unit 30 does not store the upon-replenishment remaining amount Af in the past remaining amount storage unit 31 as the past remaining amount Ap (or does not add any new data to the storage unit 31). Therefore, in case of exceptional energy replenishment events such as when energy is replenished in spite of a plentiful energy remaining amount because the driver discovered a gas station offering a bargain price and when energy is replenished only after the energy remaining amount has dropped to an unusually low level because of an absence of gas stations in a particular stretch of road which the vehicle has happened to be traveling, the recommendation generation trigger point Ar is prevented from being affected by such an event. Therefore, the recommendation generation trigger point Ar is prevented from being disturbed by exceptional replenishment events.

The replenishment recommendation processing unit 30 does not display the replenishment recommendation indication 37 on the display unit 14 even when the current energy remaining amount An is equal to or less than the recommendation generation trigger point Ar if the current energy remaining amount An is equal to or less than the warning remaining amount As. Therefore, the warning lamp 8 and the replenishment recommendation indication 37 are prevented from being displayed simultaneously so that the driver is prevented from being annoyed or confused.

Although the present invention has been described in terms of a specific embodiment, the present invention is not limited to the above-described embodiment, but can be widely modified. For example, the energy mentioned in this disclosure is not limited to liquid fuel such as gasoline and diesel fuel, but may also be electric power or gaseous fuel. In the latter cases, the remaining energy sensor 3 may be consist of a battery meter and a pressure gauge, respectively.

In an alternate embodiment, when the current energy remaining amount An is equal to or less than the warning remaining amount As, the replenishment recommendation processing unit 30 displays the replenishment recommendation indication 37 on the display unit 14 even when the current energy remaining amount An is greater than the recommendation generation trigger point Ar. In this case, since the replenishment recommendation indication 37 is displayed in addition to the warning lamp 8, the driver can be particularly clearly notified of the lowering of the energy remaining amount.

The invention claimed is:

1. A replenishment recommendation system for making a recommendation to a driver of a vehicle to replenish energy for the vehicle, comprising: a replenishment intent switch configured to be operated by the driver to indicate an intent to replenish energy; a non-transitory storage medium configured to store a remaining amount of energy of the vehicle as a past remaining amount when replenishment is initiated, when the replenishment intent switch is operated, or when a replenishment recommendation is executed; and a control unit comprising a CPU that comprises: a selection unit configured to store, in the non-transitory storage medium, the remaining amount as the past remaining amount when a first condition is satisfied, the first condition being satisfied by an operation of the replenishment intent switch; a recommendation generation trigger point computation unit configured to compute a recommendation generation trigger point given as a remaining amount of energy that triggers an energy replenishment recommendation to the driver to replenish energy based on the past remaining amounts stored in the non-transitory storage medium; and a recommendation generation unit provided with a display unit and configured to display a replenishment recommendation indication on the display unit when a current energy remaining amount of the vehicle has become equal to or less than the recommendation generation trigger point, wherein the selection unit is configured to store, in the non-transitory storage medium as the past remaining amount, an energy remaining amount at a time point of displaying the replenishment recommendation indication on the display unit if a second condition is satisfied, the second condition being satisfied when the replenishment intent switch is not operated, and a distance traveled by the vehicle from the time point of displaying the energy replenishment recommendation indication to a time point of detecting the replenishment of energy is equal to or less than a prescribed distance determination value.

2. The replenishment recommendation system according to claim 1, wherein the CPU further comprises a replenishment detection unit configured to detect a replenishment of energy for the vehicle.

3. The replenishment recommendation system according to claim 2, wherein the selection unit is configured to store, in the non-transitory storage medium as the past remaining amount, an energy remaining amount at a time point of initiation of energy replenishment, instead of at the time point of displaying a replenishment recommendation indication on the display unit, if a third condition is satisfied, the third condition being satisfied when the replenishment intent switch is not operated, the distance traveled by the vehicle from the time point of displaying the replenishment recommendation indication to the time point of detecting the replenishment of energy is greater than the prescribed distance determination value, and a difference between the recommendation generation trigger point and the energy remaining amount at the initiation of energy replenishment is smaller than a prescribed remaining amount difference determination value.

4. The replenishment recommendation system according to claim 3, wherein the selection unit is configured to store no new data in the non-transitory storage medium if a fourth condition is satisfied, the fourth condition being satisfied when the replenishment intent switch is not operated, the distance traveled by the vehicle from the time point of displaying the replenishment recommendation indication to the time point of detecting the replenishment of energy is greater than the prescribed distance determination value, and the difference between the recommendation generation trigger point and the energy remaining amount at the initiation of energy replenishment is equal to or greater than the prescribed remaining amount difference determination value.

5. The replenishment recommendation system according to claim 1, wherein the replenishment intent switch is generated or enabled only when the replenishment recommendation indication is displayed on the display unit.

6. The replenishment recommendation system as defined in claim 1, wherein the recommendation generation trigger point computation unit is configured to compute the recommendation generation trigger point by averaging a plurality of the past remaining amounts.

7. The replenishment recommendation system as defined in claim 2, further comprising an energy remaining amount sensor for detecting the current energy remaining amount, the replenishment detection unit being configured to detect an initiation of replenishment when the current energy remaining amount has increased by more than a prescribed amount during a prescribed time period.

8. The replenishment recommendation system as defined in claim 1, further comprising a warning light that lights up when the current energy remaining amount is equal to or less than a prescribed warning remaining amount, wherein the recommendation generation unit is configured not to display the replenishment recommendation indication on the display unit if the warning light has lighted up even when the current energy remaining amount is equal to or less than the recommendation generation trigger point.

9. The replenishment recommendation system as defined in claim 1, wherein the display unit is formed as a touch panel display unit, and the replenishment intent switch is selectively generated on the touch panel display.

10. The replenishment recommendation system as defined in claim 9, wherein the replenishment intent switch is generated in a superimposed relationship to the replenishment recommendation indication displayed on the touch panel display.

11. The replenishment recommendation system as defined in claim 1, wherein the CPU further comprises a replenishment station recommendation unit configured to display information on at least one recommended energy replenishment station on the display unit when the driver's intent to replenish energy is entered from the replenishment intent switch.

12. The replenishment recommendation system as defined in claim 11, wherein the replenishment station recommendation unit is configured to assign priority levels to a plurality of recommended energy replenishment stations according to pricing and/or the driver's selection history, and to display information on at least some of the recommended energy replenishment stations on the display unit according to the priority levels.

13. A replenishment recommendation method for making a recommendation to a driver of a vehicle to replenish energy for the vehicle by using the system as defined in claim 1, comprising:

storing a remaining amount of energy of the vehicle in the non-transitory storage medium as a past remaining amount when a first condition is satisfied, the first condition being satisfied by a detection of an operation of the replenishment intent switch;

computing a recommendation generation trigger point given as a remaining amount of energy that triggers an energy replenishment recommendation to the driver to replenish energy based on the energy remaining amounts stored in the non-transitory storage medium; and displaying a replenishment recommendation indication on the display unit when a current energy remaining amount of the vehicle has become equal to or less than the recommendation generation trigger point.

* * * * *